March 8, 1966 J. B. CHATTEN ET AL 3,239,606

IMAGE TRANSMISSION SYSTEM EMPLOYING SIMULTANEOUS SCANNING OF ADJACENT PATHS WITH SEQUENTIAL TRANSMISSION OF RESULTANT SCAN SIGNALS

Filed May 3, 1962 3 Sheets-Sheet 1

INVENTORS
JOHN B. CHATTEN
MELVIN E. PARTIN
BY CHARLES F. TEACHER

Robert D. Sanborn
ATTORNEY

March 8, 1966 J. B. CHATTEN ET AL 3,239,606

IMAGE TRANSMISSION SYSTEM EMPLOYING SIMULTANEOUS SCANNING OF ADJACENT PATHS WITH SEQUENTIAL TRANSMISSION OF RESULTANT SCAN SIGNALS

Filed May 3, 1962 3 Sheets-Sheet 2

INVENTORS
JOHN B. CHATTEN
MELVIN E. PARTIN
BY CHARLES F. TEACHER

Robert D. Sanborn
ATTORNEY

IMAGE TRANSMISSION SYSTEM EMPLOYING SIMULTANEOUS SCANNING OF ADJACENT PATHS WITH SEQUENTIAL TRANSMISSION OF RESULTANT SCAN SIGNALS
Filed May 3, 1962 3 Sheets-Sheet 3
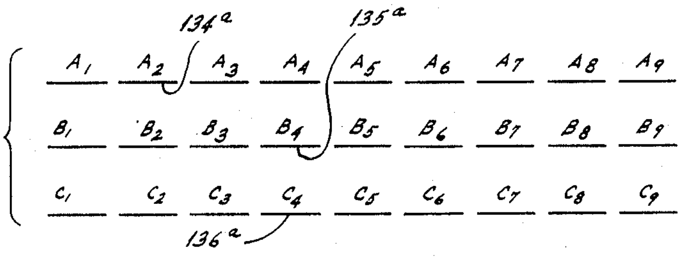
FIG. 8.
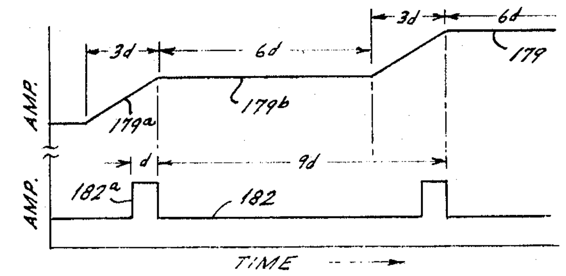
FIG. 8A.
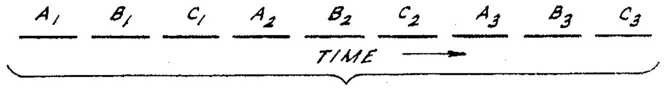
FIG. 9.
FIG. 9A.
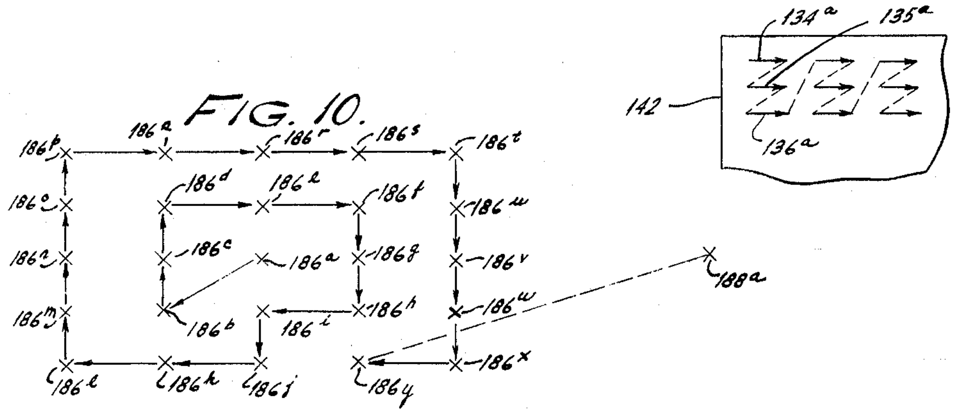
FIG. 9A, FIG. 10.
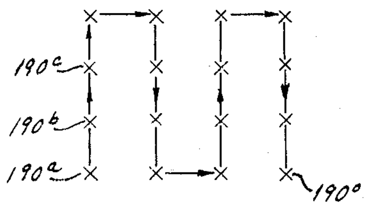
FIG. 11.
INVENTORS
JOHN B. CHATTEN
MELVIN E. PARTIN
BY CHARLES F. TEACHER
Robert D. Sanborn
ATTORNEY United States Patent Office 3,239,606

Patented Mar. 8, 1966

3,239,606

IMAGE TRANSMISSION SYSTEM EMPLOYING SIMULTANEOUS SCANNING OF ADJACENT PATHS WITH SEQUENTIAL TRANSMISSION OF RESULTANT SCAN SIGNALS

John B. Chatten and Charles F. Teacher, Philadelphia, and Melvin E. Partin, Montgomeryville, Pa., assignors to Philco Corporation, Philadelphia, Pa., a corporation of Delaware Filed May 3, 1962, Ser. No. 192,178

4 Claims. (Cl. 178—7.2)

The present invention relates to image transmission systems, and more particularly to means for reducing the time-band-width product of signals generated by such systems.

Transmission of fixed copy, such as photographs, maps, charts, etc. from one point to another, is generally accomplished by scanning the copy in a parallel line raster by suitable electro-optical means to generate an electrical signal having an amplitude-versus-time variation which is representative of the variation in density or reflectivity encountered by the scanning element in its passage over the copy. It is well known that, for a purely random image on the copy, the product of the bandwidth required to transmit the image signal and the time of transmission is directly proportional to the product of the number of scanning lines per unit time and the maximum number of resolvable elements in any one line.

The mere limiting of the bandwidth of the generated signal in an attempt to reduce the time bandwidth product results in a corresponding reduction of detail in high detail areas. The rapidly multiplying use of the available radio spectrum and the introduction of space-to-earth communication systems have increased the need for image transmission systems which have a time-bandwidth product substantially lower than that of conventional line scan systems for the same degree of detail in the copy.

Therefore it is an object of the present invention to provide a system in which the time-bandwidth product required to transmit many common types of images is less than for conventional line scan systems.

A further object of the present invention is to provide an image scanning system which provides an output signal more adaptable to bandwidth compression techniques than signals provided by known image scanning systems.

In general, these and other objects of the present invention are achieved by scanning the copy element by element in a succession of small areas, each dimension of these small areas being equal to a multiple of the dimension of the minimum resolvable element. The video signal produced by the scanning is supplied to a receiver or reproducer which has a scan coordinated with the scan of the transmitter system.

For a better understanding of the present invention together with other and further objects thereof, reference should now be had to the following detailed description which is to be read in conjunction with the drawings in which:

FIGS. 8 and 8A are diagrams which illustrate the mode of operation of the system of FIG. 7;

FIG. 9 is a timing diagram relating to the system of FIG. 7;

FIG. 9A is a fragmentary view showing the apparent small area scan pattern for the system of FIG. 7; and FIGS. 10 and 11 are diagrams of other forms of small area scan patterns which may be employed in the present invention.

In the present invention the copy is scanned element by element as in conventional line scanning systems. However, instead of scanning elements lying along a straight line extending across the full width of the copy the elements are scanned in a multiplicity of short, adjacent lines or in such an order that all elements within a small area several elements wide and several elements long are scanned in succession. This type of two dimensional or small area scan is continued area by area until the entire copy has been scanned.

In its broadest scope the invention is not limited to any particular means for generating the desired small area scan. However two scanning means, each providing the requisite small area scan patterns, will be described by way of example.

Figure 1:
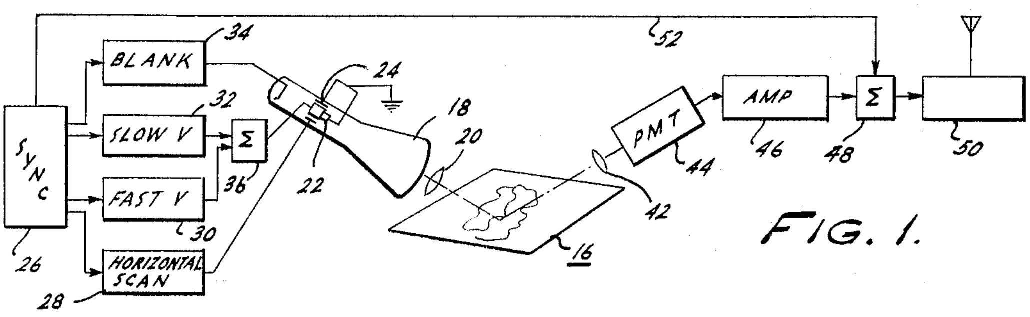
FIG. 1 is a block diagram of a typical image transmitting system embodying the present invention.

In FIG. 1 the copy to be reproduced is represented diagrammatically at 16. This copy may be a photographic print, map, or the like. A flying spot scanner tube 18 is positioned so that the screen thereof may be optically projected by lens 20 to cover the entire area of copy 16. Tube 18 is provided with suitable means for scanning the beam in two mutually perpendicular directions. As is well known in the art magnetic scan deflection means are necessary if high resolution scanning is required. However in the interest of simplifying the drawing it is assumed that scanner tube 18 is provided with two pairs of electrostatic deflection plates 22 and 24 and that one plate of each pair is maintained at ground potential.

Synchronizing source 26 is coupled to and synchronizes the operation of horizontal scan generator 28, fast vertical scan generator 30, slow vertical scan generator 32 and blanking signal generator 34. Synchronizing source 26 may comprise a stable oscillator circuit with a number of frequency divider chains which provide synchronizing signals at selected submultiples of the basic oscillator frequency.

Horizontal scan generator 28, fast vertical scan generator 30 and slow vertical scan generator 32 may comprise conventional sawtooth generator circuits, each operating at the appropriate frequencies described hereinafter. The output of horizontal scan generator 28 is coupled directly to the horizontal deflection plates 24. The outputs of fast vertical scan generator 30 and slow vertical scan generator 32 are combined in an adder circuit 36. The output of adder 36 is coupled to the vertical deflection plates 22.

A second lens 42 images the copy 16 on the photosensitive surface of a photomultiplier tube 44. Photomultiplier tube 44 may be positioned so that it receives the light reflected from opaque copy, or so that it receives the light transmitted through negative copy, translucent paper or the like. The output of photomultiplier 44 is a video signal similar to the video signal generated by conventional facsimile scanners but having a lower time-bandwidth product. This video signal may be combined with the necessary synchronizing signals from source 26 for transmission in a conventional manner by wire, radio or the like. In the example chosen for illustration in FIG. 1 the output signal from photomultiplier tube 44 is supplied by way of amplifier 46 and adder circuit 48 to a suitable radio transmitter represented by block 50. Transmitter 50 may be any conventional data link transmitter. Adder 48 receives a separate input 52 from synchronizing source 26. In accordance with conventional television transmission practice the synchronizing signals supplied on input 52 may be in the direction "blacker than black" so as not to interfere with the video signals supplied by photomultiplier tube 44.

Figure 2:
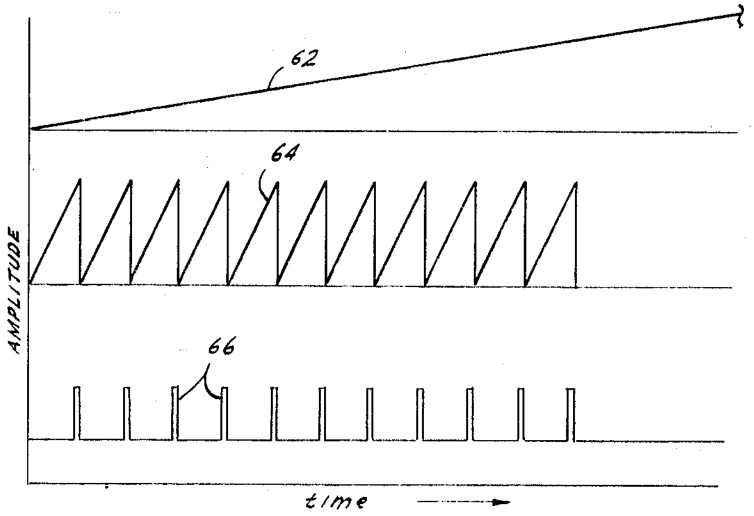
FIG. 2 is a time versus amplitude plot of signals generated by certain of the circuits of FIG. 1.

FIGURE 2 is a time-versus-amplitude plot of a portion of the signals supplied by blanking circuit 34, the fast vertical scan generator 30 and the horizontal scan generator 28.

In a typical system having 200 lines per inch resolution the signals generated by horizontal scan generator 28 and slow vertical scan generator 32 may be such that 40 horizontal scans are completed for each inch of vertical scan. In such a system the fast vertical scan would have an amplitude such that the beam is deflected vertically by $\frac{1}{40}$ of an inch, i.e. five "lines," on each fast scan cycle. The period of the fast scan is such that 200 fast vertical scans are completed for each inch of horizontal deflection. The repetition frequency of the various sweeps will be determined by the bandwidth available for transmitting the resultant video signal. It is to be understood that when transmitting a signal representing fixed copy such as a photograph or the like, the overall bandwidth of the transmitted signal may be reduced by lowering the frequency of all of the scans proportionally. Alternatively the time of transmission may be reduced by increasing the frequency of all of the scans proportionally. However the time-bandwidth product will remain substantially constant regardless of the sweep speeds chosen.

A time versus amplitude plot of a portion of the horizontal scan signal provided by horizontal scan generator 28 is shown at 62 in FIG. 2. Waveform 64 is a plot of a portion of the signal of the fast vertical scan signal supplied by fast vertical scan generator 30. Pulses 66 in FIGURE 2 represent retrace blanking pulses for the fast vertical scan. These pulses may be supplied by blanking gate generator 34. In addition blanking gate generator 34 may supply blanking pulses (not shown) of longer duration and at more widely spaced intervals for horizontal retrace blanking and vertical retrace blanking.

Figure 3:
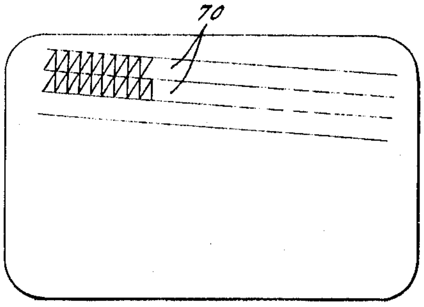
FIG. 3 is a view of the screen of the flying spot scanner showing the path traced by the scanning spot.

FIG. 3 is a view of the screen of flying spot scanner tube 18 showing the path traced by the scanning spot. It is to be understood that while only a relatively few horizontal scans 70 are indicated in FIG. 3, in an actual system there may be anywhere from 10 to 200 horizontal scans per inch depending upon the degree of resolution desired. As mentioned above, in a typical system having 200 lines per inch resolution the ratio of the slow vertical sweep frequency to horizontal sweep frequency may be such that the projection of the horizontal scans 70 on copy 16 advances approximately $\frac{1}{40}$ of an inch for each complete horizontal scan.

Figure 4:
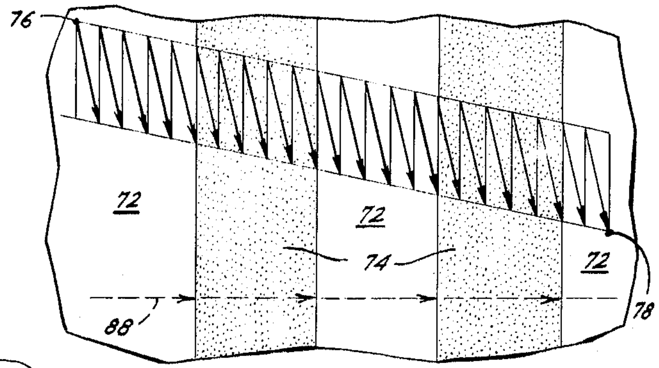
FIG. 4 is an enlarged view of a portion of copy 16 and the raster superimposed thereon.

FIG. 4 is an enlarged view of a portion of copy 16 having projected thereon the raster from the screen of tube 18. It is assumed that the portion of the copy being scanned is made up of white background portions 72 separated by two vertical black bars 74. It is assumed further that the two vertical bars 74 have a width such as to accommodate five fast vertical sweep traces. The central white bar 72 also accommodates five vertical sweep traces. It should be noted that in a time interval equal to five fast vertical scan cycles the scanning spot traces out an approximately square (actually rhombic) pattern. Therefore the scan produced by the system of FIG. 1 is referred to hereinafter as an area scan or small area scan pattern to differentiate it from the line scanning patterns of the prior art.

Figure 5:
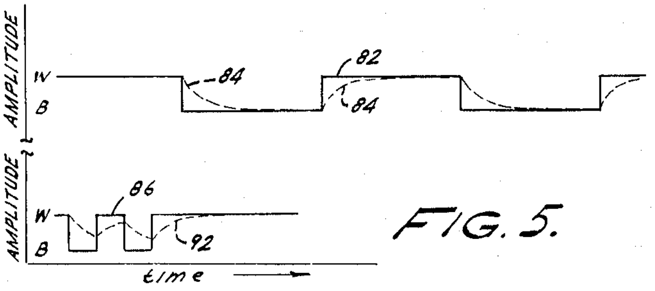
FIG. 5 is a time versus amplitude plot of a portion of the signal supplied by the photomultiplier in the system of FIG. 1.

FIG. 5 is a plot of the amplitude-variation of the output signal of photomultiplier tube 44 in response to the scan from point 76 to point 78 in FIG. 4. The solid square wave 82 in FIGURE 5 represents the variation in signal supplied by photomultiplier tube 44 of FIGURE 1. The broken line portion 84 represents the degradation in waveform which would result from band-limiting the signal represented by the square wave 82. It will be seen that this would have the effect of blurring the edges of the dark bands 74 but that the dark bands 74 would be readily resolvable.

The solid waveform 86 in FIGURE 5 represents, to the same time scale as square wave 82, the signal which would be generated by a line scan system in which the beam follows dotted path 88 of FIGURE 4. It will be seen that the fundamental frequency for the waveform 86 is five times that of waveform 82. The broken line 92 in FIGURE 5 represents the degradation in the waveform 86 which would result from the same band-limiting that is imposed on waveform 82 to produce waveform 84. It should be noted that the black bands 74 and the central white band 72 tend to blend together in waveform 92. Thus it will be seen that the scanning system of FIGURE 1 will transmit an image with better horizontal resolution for the same bandwidth (and hence the same time-bandwidth product) than conventional line scan systems.

The increase in horizontal detail achieved by the fast vertical scan and reduced horizontal scan speed employed in the present invention is achieved at a slight sacrifice in vertical resolution. However it can be shown that the small area scan pattern of FIGURE 4 produces a better compromise between vertical definition and horizontal definition and hence will produce a better over-all picture for the same time-bandwidth product than the conventional line scanning patterns of the prior art. This results from the fact that the correlation between the reflectivity of a given number of picture elements in a square area is generally higher than the correlation between the same number of picture elements along any line of the copy. Thus there will be fewer variations in the envelope amplitude for small area scan patterns than for linear scan patterns.

Figure 6:
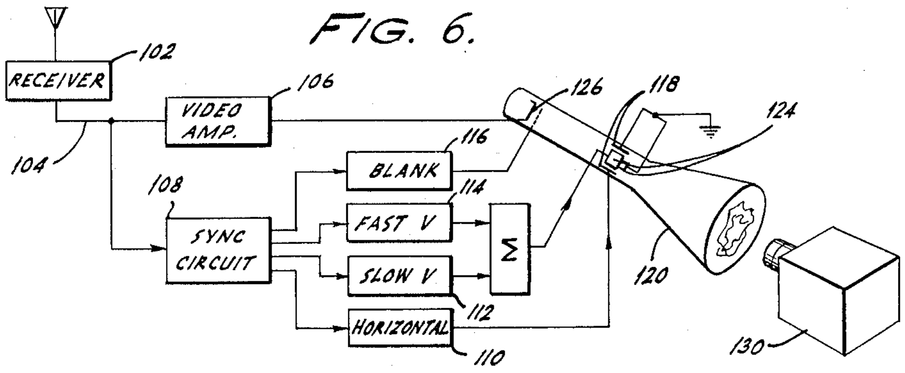
FIG. 6 is a block diagram of a typical receiver system for use in conjunction with the transmitter of FIG. 1.

FIGURE 6 is a block diagram of a typical receiver for a signal supplied by the system of FIGURE 1. The block 102 in FIGURE 6 may comprise suitable superheterodyne circuits for receiving the energy transmitted by transmitter 50 of FIGURE 1 and converting it to a video signal at output connection 104. Block 106 may be a conventional video amplifier. Synchronizing signal separator 108 may comprise a clipper circuit which removes the "blacker than black" synchronizing signals added to the video signal in adder 48 of FIGURE 1. Synchronizing circuit 108 may also contain counting circuits for producing synchronizing signals which are comparable to those produced by circuit 26 in FIGURE 1. The several outputs of synchronizing circuit 108 are connected to horizontal scan generator 110, slow vertical scan generator 112, fast vertical scan generator 114 and blanking signal generator 116. These last-mentioned four elements may correspond to the similarly identified circuits 28, 32, 30 and 34 respectively of FIGURE 1. The output of horizontal scan generator 110 is supplied to horizontal deflection plates 118 of the cathode ray picture tube 120. The fast vertical sweep signal from block 114 and the slow vertical sweep signal from block 112 are combined in added circuit 122 and supplied to the vertical deflection means 124 of cathode ray tube 120. It will be obvious to those skilled in the art that the scanning spot of tube 120 will follow the same trace as the scanning spot on tube 18 of FIGURE 1. The video signals supplied by video amplifier 106 to the cathode 126 of cathode ray tube 120 will intensity modulate the beam in accordance with the signal received by photomultiplier tube 44 of FIGURE 1. Therefore the image appearing on the screen of cathode ray picture tube 120 will be a reproduction of the copy 16 of FIGURE 1. Means such as the camera indicated diagrammatically at 130 may be employed for making a permanent record of the image appearing on the screen of cathode ray picture tube 120.

Figures 7, 7A:
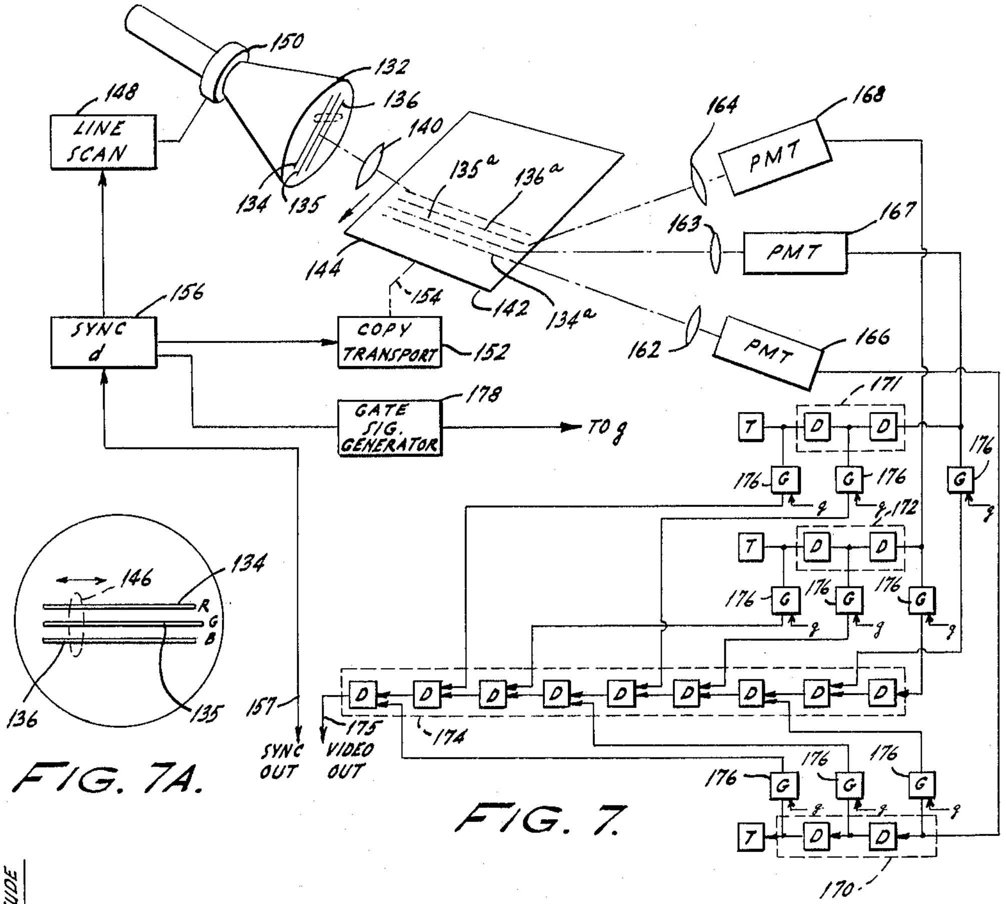
FIG. 7 is a diagram of an image transmitter system employing a slightly different small area scan pattern.
FIG. 7A is an enlarged view of the screen of the flying spot scanner of FIG. 7.

FIG. 7 illustrates a second embodiment of the invention which employs different means for obtaining small area scan. In the image transmitter system of FIGURE 7 the flying spot scanner tube 132 is provided with three parallel, closely spaced color stripes 134, 135 and 136, respectively. The lines 134–136 are so oriented on screen of tube 132 that when they are projected by lens 140 on copy 142 they lie substantially parallel to the edge 144 of the copy. The beam generated by flying spot scanner 132 is preferably elliptical in cross section as shown by the broken line 146 in FIGURE 7A. Thus the beam impinges on all three of the color stripes 134–136 at the same time. The line scan generator 148 is coupled to the deflection yoke 150 of cathode ray tube 132. Line scan generator 148 may be a simple sawtooth generator but preferably is a circuit for producing a stepped sawtooth wave of the type shown at 179 in FIG. 8A. Deflection yoke 150 is oriented so that the beam of the cathode ray tube is deflected parallel to the longer dimension of phosphor lines 134–136. Copy transport means represented by the numbered block 152 comprises means for transporting the image or copy 142 in a direction at right angles to the edge 144. The broken line 154 represents schematically the coupling between the copy 142 and the carry transport 152. The motion imparted by copy transport 154 may be either a continuous motion or an intermittent motion. The rate of motion should be such that the entire copy 142 is scanned in adjacent lines.

A synchronizing source 156 is coupled to line scan generator 148 and to copy transport 152 to synchronize the operation of these two elements of the system. Again synchronizing source 156 may comprise a highly stable oscillator with necessary count-down circuits for supplying synchronizing signals at proper frequencies to line scan generator 148 and copy transport 152.

Lenses 162, 163 and 164 of FIG. 7 the image the illuminated lines on copy 142 on the photosensitive surfaces of photomultiplier tubes 166, 167 and 168, respectively. Photomultiplier tube 166 is responsive only to light of the color produced by line 134. Similarly photomultiplier tubes 167 and 168 are responsive only to light of the colors generated by lines 135 and 136 respectively.

The video signal outputs of photomultiplier tubes 166, 167 and 168 are coupled to the inputs of multistage delay lines 170, 171 and 172 respectively. The inputs of each of the delay lines 170–172 and two taps on each of the three delay lines are coupled to spaced taps on a signal combining delay line 174 by way of signal actuated gate circuits 176. Delay lines 170–172, 174, and gate circuits 176 comprise a three-channel signal multiplexer of the type disclosed and claimed in the copending application of Francis P. Keiper, Jr., Serial No. 184,176, filed April 2, 1962.

The circuit shown in FIGURE 7 operates in the following manner. The movement of the elliptical spot 146 along the three colored phosphor lines 134, 135 and 136 causes three adjacent lines on copy 142 to be illuminated. The video signals provided by photomultiplier tubes 166–168 are representative of the variations in reflectivity along the respective lines $134^a$–$136^a$. The scan along each of these lines may be considered as broken up into imaginary discrete scanning sections equal in length to the delay time $d$ of each of the sections of delay lines 170–172 and 174. In FIGURE 8 nine successsive segments for line $134^a$ are represented as segments $A_1$–$A_9$. Similarly the imaginary discrete segments for the scan along lines $135^a$ and $136^a$ is represented in FIGURE 8 by sections $B_1$–$B_9$ and $C_1$–$C_9$, respectively. As shown in FIG. 8A the scan signal 179 provided by line scan circuit 148 is preferably such that the spot 146 scans successive segments $A_1$, $A_2$ and $A_3$ at a uniform rate in response to the portion 179*a* of waveform 179 and then stops for a time interval having a duration $6d$ as represented by portion 179*b*. At the end of this interval the next three successive segments $A_4$, $A_5$ and $A_6$ are scanned at a uniform rate. The entire line $134^a$ is scanned in this fashion. It is to be understood that lines $135^a$ and $136^a$ are scanned in a similar manner simultaneously with the scan of line $134^a$. The purpose of the interrupted sweep is to permit the multiplexing of the three signals from photomultiplier tube 166, 167 and 168 in a single output channel 175 without loss of data. Waveform 182 in FIGURE 8A represents the gating signals $g$ supplied by gating signal source 178 to each of the gate circuits 176 of FIG. 7. This signal has a pulse repetition period of $9d$ and a pulse width of $d$. At the occurrence of pulse $182^a$ in FIG. 8A the signals supplied by photomultiplier tube 166 when scanning segments $A_1$, $A_2$ and $A_3$ are supplied to the inputs to the ninth, sixth, fourth and third sections, respectively of delay line 174. Similarly the signals representing segments $B_1$, $B_2$ and $B_3$ are supplied by delay line 171 to the eighth, fifth and second sections of delay line 174 and signals representing segments $C_1$, $C_2$ and $C_3$ are supplied by delay line 172 to the inputs of the seventh, fourth and first sections respectively of delay line 174.

FIGURE 9 diagrammatically represents the succession of scanned intervals represented in the single video signal present at output connection 175 for the first third of the period required for a complete scan of the three lines $134^a$–$136^a$. FIGURE 9A shows the scan pattern across copy 142 which would be required to generate the same single video output signal. Again it will be seen that the copy 142 is scanned in adjacent small areas rather than along single horizontal lines.

If a continuous sawtooth signal is generated by line scan generator 148, two additional delay line signal multiplexers of the type described will be required to process all of the data provided by photomultiplier tubes 166, 167 and 168.

The video output signal present at leads 175 and 157 in FIGURE 7 may be coupled by way of an adder circuit such as adder circuit 48 of FIG. 1 to a transmitter.

It will be obvious to those skilled in the art that tube 132 may be provided with adjacent color triplets. In such a system copy transport 152 may be replaced by a suitable step scan generator (not shown) coupled to deflection yoke 150 to step the beam 146 from one triplet to the next at the end of each complete horizontal scan.

The invention is not limited to the particular scan pattern shown but may employ any convenient small area scan pattern. For example, FIGURES 10 and 11 represent other forms of small area scan patterns which may be employed in the system of FIG. 7. In the pattern of FIG. 10, picture elements 186A through 186Y are scanned in a rectangular spiral about element 186A. Upon reaching element 186Y the scan is displaced to an element 188A in the center of an adjacent small area. The rectangular spiral is then repeated about element 188A as the center. In the pattern of FIG. 11 the successive picture elements 190*a* to 190*o* are scanned in an up-and-down zig-zag fashion. The apparent scanning patterns in FIGS. 10 and 11 may be generated by appropriate connection to delay line multiplexer of the type shown in FIG. 6.

As explained above the use of small area scan patterns reduces the time bandwidth product required for transmission of many common types of images. More precise types of image transmission systems preserve additional detail without increasing the time-bandwidth product by indicating the presence of certain types of transitions or certain types of areas by appropriate digital code sent along with or as part of the video signal. The small area scan pattern described and claimed herein may be used advantageously in such systems to reduce the number of transitions which must be encoded.

It will be understood that the receiver associated with any of the image transmitters just described may be similar to the receiver shown in FIG. 6 but suitably modified to cause the beam of the cathode ray tube to follow the actual or apparent scan pattern of the associated transmitter.

While the invention has been described with reference to the preferred embodiments thereof, it will be apparent that various modifications and other embodiments thereof will occur to those skilled in the art within the scope of the invention. Accordingly we desire the scope of our invention to be limited only by the appended claims.

We claim:

1. In an image transmission system, the combination comprising:

(a) scanning means including an image scanning element;

(b) scan control means associated with said image scanning element for causing said element to scan simultaneously several adjacent lines of elements of said image, and to repeat said scan on other, adjacent lines of elements, thereby to scan the entire image;

(c) detecting means arranged to receive from said scanning means, after modulation by said image to be transmitted, a plurality of simultaneously-generated signals respectively representative of said adjacent lines of elements; and (d) means, associated with said detecting means, for transmitting in successive time intervals the signals which were generated simultaneously as a result of the simultaneous scanning of said adjacent lines of elements of said image.

2. In an image transmission system, the combination comprising:

(a) means for successively scanning adjacent strips of an image, each of said strips comprising a plurality of parallel lines of elements of said image;

(b) a corresponding plurality of separate detectors arranged to receive from said image, in response to said scanning, a corresponding plurality of simultaneously-generated information signals respectively representative of said individual lines of elements; and (c) means, associated with said detectors, for transmitting in successive time intervals, portions of each of said information signals.

3. The combination of claim 2 wherein:

(a) said means for scanning comprises a flying spot scanner arranged to scan said image with a light spot having a plurality of differently-colored portions, each portion arranged to scan a respective one of said lines of elements; and wherein (b) said detectors are color sensitive, each responsive to a different one of said differently-colored portions of said light spot.

4. The combination of claim 3 wherein said detectors are photoresponsive devices, each of which includes a differently-colored optical filter.

References Cited by the Examiner

UNITED STATES PATENTS

| | | | |
|---|---|---|---|
| 2,093,157 | 9/1937 | Nakashima. | |
| 2,222,934 | 11/1940 | Blumlein | 178—6.8 |
| 2,623,196 | 12/1952 | Toulon | 178—7.5 |
| 2,911,463 | 11/1959 | Kretzmer | 178—6 |
| 2,957,941 | 10/1960 | Covely | 178—6.8 |

DAVID G. REDINBAUGH, *Primary Examiner.*